Patented Dec. 14, 1937

2,102,456

UNITED STATES PATENT OFFICE

2,102,456

TREATMENT OF RUBBER ARTICLES

Abraham K. Brill and Walter A. Wake, Youngstown, Ohio, assignors to The Republic Rubber Company, Youngstown, Ohio, a corporation of Ohio No Drawing. Application August 17, 1935, Serial No. 36,753

7 Claims.  (Cl. 260—1)

This invention relates to the treatment of soft cured rubber and more particularly to a process for so conditioning the surface of the rubber as to generally improve the characteristics thereof.

It is well-known in the art to which this invention pertains that when soft rubber is vulcanized by any of the usual methods, even when cured under the best of conditions, as by the use of highly polished molds, the surface of the rubber product has a characteristic non-slippery finish with a high coefficient of friction. Such surfaces are easily marked, quickly become dulled and roughened in handling, and are readily susceptible to becoming dirty and stained, in consequence of which the product soon acquires an unsightly appearance. Attempts have been made from time to time to improve this condition by the application of various finishes, such as flexible varnishes, lacquers, paints and other such surface coatings but all of the latter have generally proved to be unsatisfactory because of their uneven wearing qualities, their tendency to peel and chip away from the rubber surface, and their generally unsightly appearance after the product has been in use for only a relatively short time.

It is among the principal objects of the present invention to provide a treatment for soft cured rubber of such character that there is imparted thereto a surface which is at once tough, elastic and so hardened that it is not easily marked by dirt, stains and other such disfiguring substances, which is highly polishable, and which has a non-tacky, slippery smooth feel not characteristic of ordinary soft rubber.

A further object is to produce soft cured rubber articles the surfaces of which are highly resistant to oil, sunlight and other such elements which ordinarily tend to induce surface cracks and checks in articles formed of rubber and the like.

As has been indicated above, rubber articles which have been subjected to the surface-conditioning treatment of the present invention are materially improved not only in their external appearance, due to the high polishability of the treated surface, but also in their physical characteristics. For example, in the case of all-rubber pulley belts, when the latter are surface-finished in accordance with the invention to be presently described, the non-tacky, smooth surface produced has such a relatively low coefficient of friction that there is eliminated the danger of the pulley "seizing" the rubber belt and so causing the rubber to melt through to result in a broken belt. Of course, many other examples of rubber products may be cited in connection with which it is advantageous to provide a hard, tough, non-tacky and highly polishable surface and it is to be understood therefore that it is within the contemplation of the present invention to provide various and sundry rubber products with surfaces having the characteristics and attributes hereinbefore mentioned, the invention being not limited to any particular product but rather to the process for surface-conditioning the rubber of which the product is formed.

We have found that the desired surface characteristics are obtainable by subjecting the rubber products to certain chemicals which may be broadly classified in two groups as follows:—the halogens and the strong mineral acids. In the halogen group are included the following elements:—bromine, chlorine, fluorine and iodine; while in the mineral acid group the following materials are included:—nitric acid, sulphuric acid, hydrochloric acid, chromic acid, hydriodic acid and hydrobromic acid. We have found that when any of the above chemicals are employed in treating the surface of a soft cured rubber article it reacts with the surface of the rubber to form, in combination with the rubber, a new surface which is tough, resilient and readily polishable and which has a characteristic that can best be described as being "slippery smooth." While it is known that rubber is fairly reactive with certain chemicals, the mechanism of the reaction is not definitely known and accordingly no attempt is made herein to express definitely what reaction, if any, is obtained when the rubber is subjected to the treatment of our present invention. Rather, we merely venture the observation that the combination formed upon the surface of the treated rubber may possibly be likened to that obtained by ordinary sulphur vulcanization, the difference being that the product obtained when subject to our present treatment is provided with a surface which is harder, tougher and more readily polishable than that obtained by further vulcanization of the rubber with sulphur alone.

While any of the above halogens or mineral acids may be employed, either singly or in combination, to produce the desired surface condition, we have found that certain of them are more preferable to use due to the greater facility with which they may be handled. Of the halogens we have found that bromine and chlorine may be most advantageously employed, while of the mineral acid group concentrated sulphuric and nitric acids are the most desirable.

In the use of the halogens, the treatment may involve subjecting the rubber products to one or another of the halogens or to a combination thereof with the halogen or halogens in a purely gaseous state or in a liquid solution. Thus, the rubber products may be placed in a chamber filled with bromine vapor or chlorine gas or a combination thereof, or the rubber products may be immersed in a saturated aqueous solution of bromine or chlorine or a combination thereof. Where it is desired to employ iodine as the surface conditioning agent the iodine may be dissolved in alcohol or ether or in an aqueous solution of potassium iodide, hydrogen iodide or any other iodide, the rubber products to be treated being immersed in the iodine solution so provided.

Fluorine, while not so easily handled as the other halogens, may be employed in a gaseous state in substantially the same manner as gaseous chlorine or it may be employed in suitable solutions of potassium or hydrogen fluorides to provide a liquid bath within which the rubber products to be treated may be immersed.

In the use of the mineral acids above referred to, the rubber products to be treated are preferably immersed in a liquid bath of one or another of these acids. In this connection we have found that a mixture of concentrated nitric acid and concentrated sulphuric acid produces most desirable results and we prefer such mixture of these acids to the use of either acid alone because of the greater ease of handling of the mixture and the more uniform surface-conditioning results obtained. Certain of the mineral acids may be employed, if desired, in their gaseous state, as, for example, hydrochloric and hydrofluoric acids, these acid gases or vapors being placed in sealed chambers within which the rubber products to be treated are also placed.

It is preferable, upon removal of the rubber products from the treatment medium, particularly where it consists of non-volatile acids, such as nitric and sulphuric acids, to wash any excess of the reacting agent from the surface of the rubber product. To this end, immediately upon removal of the rubber products from the treating medium, they are washed with water, following which the treated surface may be further washed with an alkali, such as dilute ammonia, to neutralize any traces of the reacting agent which may have adhered to the surface of the rubber. Dilute ammonia is preferably employed as a neutralization agent because it is completely volatile and leaves no residue.

In the use of these surface-conditioning agents, it is not possible to state definitely the exact time which must elapse while the rubber product is being subjected to the influence of a particular surface-conditioning agent. The period during which the rubber product is immersed within the liquid treatment bath or subjected to the gaseous treatment depends, of course, not only on the particular chemical which is employed and its form, but also on other factors, such as concentration of the surface-conditioning medium, its temperature, and the type of surface which it is desired to produce upon the rubber product being treated. Preferably, the treatment is performed at room temperature, any substantial variations in which might require some compensatory change in the length of the period during which the articles to be treated are subjected to the treatment medium being currently employed. Inasmuch as the rubber products may vary materially in their character and thus require entirely different surface characteristics, it has been found necessary in the use of the present treatment in order to determine the best period of exposure for a particular article, to first expose the article to a particular reacting agent for a minimum period and then finish it immediately by polishing, this operation being repeated for gradually increasing periods of exposure until the most satisfactory surface is obtained for that particular article. The most effective period of exposure thus obtained after these preliminary trails is then determined as the optimum dripping time to be used for any current production of that particular product for a given surface-conditioning medium, which latter may be either in liquid or gaseous state as described above. As a specific example, where a mixture of eighty parts of concentrated nitric acid and twenty parts of concentrated sulphuric acid was employed as the surface-conditioning medium for a lot of vacuum cleaner handles, it was determined after several preliminary trial treatments that the best surfacing results were obtained when the rubber handles were immersed for a period approximating fifteen seconds. The period of exposure may, however, vary from five seconds to ten minutes or more, depending upon the type of treating medium employed and the type of surface desired to be obtained. For example, where bromine solution is employed it may be necessary to expose the articles to the influence of the reacting medium for as much as ten minutes to obtain a desired surface condition, while in the case of hydrochloric gas the time of exposure may extend to as much as six to eight hours.

If the time of exposure is extended over too long a period, the hard skin which is formed upon the surface of the rubber article may be too thick with the result that the external surface thereof becomes so brittle that checks and cracks are produced on the surface. For example, if the vacuum cleaner handles above mentioned had been dipped for say three minutes instead of for fifteen seconds, their surface would have been so deeply cracked that it could not have been finished in the desired manner. Accordingly, once an optimum dipping time is established for a given rubber article to be treated and for a given treatment medium, that time must be adhered to within reasonable limits if uniform results are to be obtained for any current run of a lot of such articles.

Following the step of subjecting the rubber articles to the surface-conditioning treatment as hereinbefore described, the articles so treated, may be dried and are then finished by polishing in any desired manner, as, for instance, by tumbling or by the application of a polishing wheel to the treated surface. With the surface preliminarily conditioned in the manner hereinbefore described any desired degree of lustre may be given to the surface of the rubber article.

What is claimed as new and useful is:

1. A method for surface-conditioning an article formed at least partially of rubber which consists in subjecting the rubber surface of the article to the action of a solution containing nitric acid for a length of time sufficient to form a hard polishable skin thereon.

2. A method for treating an article having a rubber surface which consists in initially immersing said surface in a nitric acid bath; in maintaining said surface immersed for a period of time sufficient to form upon said surface a hard, polishable skin; and in washing the treated surface free of said nitric acid upon removal from the bath.

3. A method for treating an article having a rubber surface which consists in initially subjecting said surface to the action of nitric acid; in maintaining said surface immersed for a period of time sufficient to form upon said surface a hard, polishable skin; and in neutralizing any excess acid which may adhere to said surface upon removal thereof from the bath.

4. A soft, cured rubber article having a ground, highly polished nitric acid hardened surface layer.

5. A soft, cured rubber article having a ground, highly polished hardened surface layer formed in situ by a surface-conditioning agent containing essentially nitric acid.

6. A method for treating an article having a rubber surface which comprises subjecting the surface thereof to the action of a surface conditioning agent containing essentially nitric acid until a hard, highly polishable surface is formed, and grinding the treated surface to polish the same.

7. A method for surface-conditioning an article having a surface of rubber, which comprises immersing the article in a treatment bath containing in solution a mixture of nitric and sulphuric acids in the ratio of 80 parts of nitric acid to 20 parts of sulphuric acid.

ABRAHAM K. BRILL.
WALTER A. WAKE.